(12) United States Patent
Suzuki et al.

(10) Patent No.: US 11,010,170 B2
(45) Date of Patent: May 18, 2021

(54) ARITHMETIC PROCESSING APPARATUS WHICH REPLACES VALUES FOR FUTURE BRANCH PREDICTION UPON WRONG BRANCH PREDICTION

(71) Applicant: FUJITSU LIMITED, Kawasaki (JP)

(72) Inventors: Takashi Suzuki, Kawasaki (JP); Seiji Hirao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 16/536,354

(22) Filed: Aug. 9, 2019

(65) Prior Publication Data

US 2020/0057644 A1    Feb. 20, 2020

(30) Foreign Application Priority Data

Aug. 16, 2018    (JP) .............................. JP2018-153068

(51) Int. Cl.
  *G06F 9/38*    (2018.01)
  *G06F 9/30*    (2018.01)

(52) U.S. Cl.
  CPC ........ *G06F 9/3844* (2013.01); *G06F 9/30058* (2013.01); *G06F 9/3848* (2013.01); *G06F 9/3861* (2013.01)

(58) Field of Classification Search
  CPC .............................. G06F 9/3844; G06F 9/3848
  See application file for complete search history.

(56) References Cited

U.S. PATENT DOCUMENTS

| 9,442,726 | B1* | 9/2016 | Bonanno | ................ G06F 9/3844 |
| 10,048,969 | B2* | 8/2018 | Okazaki | .............. G06F 9/30058 |
| 2001/0020267 | A1 | 9/2001 | Koino | |
| 2010/0332812 | A1* | 12/2010 | Burger | .................. G06F 9/3844 |
| | | | | 712/239 |

(Continued)

FOREIGN PATENT DOCUMENTS

| JP | 06-089173 | 3/1994 |
| JP | 2001-243069 | 9/2001 |
| JP | 2009-037305 | 2/2009 |
| JP | 2017-027451 | 2/2017 |

OTHER PUBLICATIONS

S. McFarling: "Combining Branch Predictors", WRL Technical Note TN-36 (Jun. 1993) (29 pages).

(Continued)

*Primary Examiner* — Keith E Vicary
(74) *Attorney, Agent, or Firm* — Fujitsu Patent Center

(57) ABSTRACT

An arithmetic processing apparatus includes weight tables each configured to store weighting factors in one-to-one correspondence with indexes associated with instruction addresses, a first weight arithmetic unit configured to perform a first operation and a second operation based on the weighting factors retrieved from the weight tables in response to an instruction fetch address, the first operation producing a first value for branch prediction for the instruction fetch address, the second operation producing second values for future branch prediction, and a second weight arithmetic unit configured to perform, in parallel with the second operation, a third operation equivalent to the second operation based on the weighting factors retrieved from the weight tables in response to an address of a completed branch instruction, wherein the second values stored in the first weight arithmetic unit are replaced with the third values upon detection of a wrong branch prediction.

7 Claims, 10 Drawing Sheets

(56) References Cited

U.S. PATENT DOCUMENTS

| | | | |
|---|---|---|---|
| 2011/0087866 A1* | 4/2011 | Shah | G06F 9/3836 |
| | | | 712/239 |
| 2012/0166775 A1* | 6/2012 | Krishnamurthy | G06F 9/3848 |
| | | | 712/239 |
| 2015/0363203 A1* | 12/2015 | Lipasti | G06F 9/3848 |
| | | | 712/240 |
| 2017/0024215 A1 | 1/2017 | Okazaki et al. | |
| 2017/0153894 A1* | 6/2017 | Hornung | G06F 9/3848 |

OTHER PUBLICATIONS

E Sprangle et al., "The Agree Predictor: A Mechanism for Reducing Negative Branch History Interference", International Symposium on Computer Architecture—ISCA, pp. 284-291 (1997) (8 pages).

D. A. Jimenez et al., "Dynamic Branch Prediction with Perceptions," Proceedings of the 7th International Symposium on High-Performance Computer Architecture, p. 197 (Jan. 20-24, 2001) (10 pages).

D. A. Jimenez et al., "Neural Methods for Dynamic Branch Prediction", ACM Transactions on Computer Systems (TOCS) vol. 20 Issue 4 (Nov. 2002), pp. 369-397 (29 pages).

D. A. Jimenez, "Fast Path-Based Neural Branch Prediction," Proceedings of the 36th annual IEEE/ACM International Symposium on Microarchitecture, p. 243 (Dec. 3-5, 2003) (10 pages).

D. A. Jimenez, "Piecewise Linear Branch Prediction," Proceedings of the 32nd Annual International Symposium on Computer Architecture, (Jun. 4-8, 2005) pp. 382-393 (12 pages).

D. A. Jimenez, "OH-SNAP: Optimized Hybrid Scaled Neural Analog Predictor". In Proceedings of the 3rd Championship on Branch Prediction, http://www.jilp.org/jwac-2/, 2011 (4 pages).

* cited by examiner

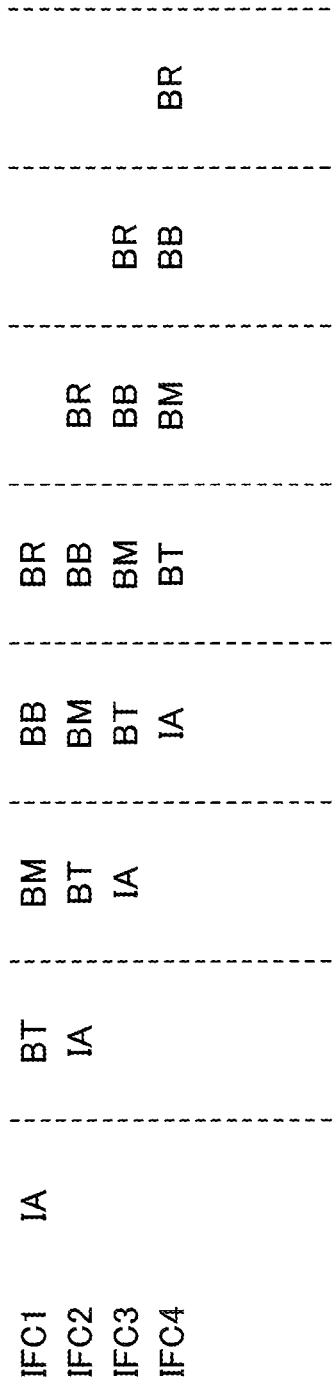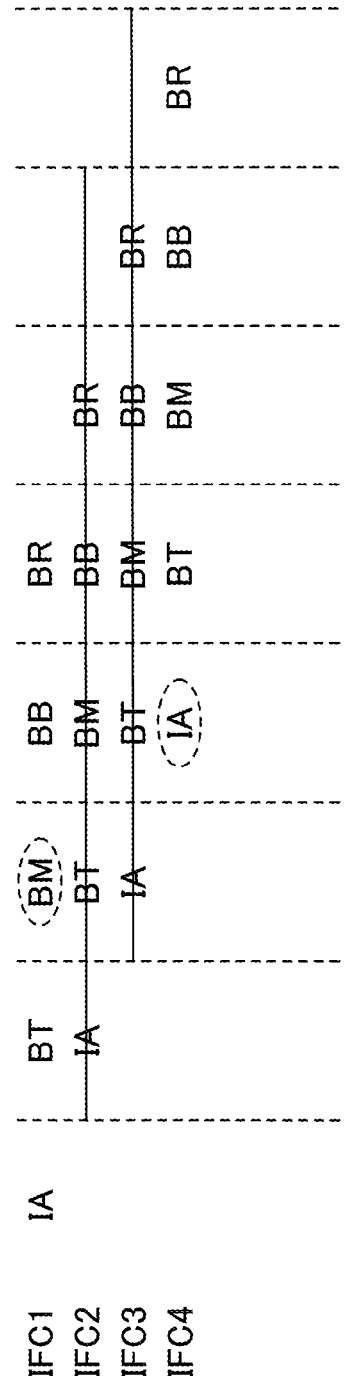

ARITHMETIC PROCESSING APPARATUS WHICH REPLACES VALUES FOR FUTURE BRANCH PREDICTION UPON WRONG BRANCH PREDICTION

CROSS-REFERENCE TO RELATED APPLICATIONS

The present application is based upon and claims the benefit of priority from the prior Japanese Patent Application No. 2018-153068 filed on Aug. 16, 2018, with the Japanese Patent Office, the entire contents of which are incorporated herein by reference.

FIELD

The disclosures herein relate to an arithmetic processing apparatus and a method of controlling an arithmetic processing apparatus.

BACKGROUND

The technology for increasing the speed of processors includes a pipeline optimization technique based on branch prediction. For branch prediction, a branch prediction mechanism predicts a branch direction indicative of whether the branch is taken or not taken with respect to a branch instruction to be executed, and also predicts the target address of the branch instruction (i.e., branch destination address). With this arrangement, subsequent instructions can be speculatively executed according to a prediction outcome before whether or not the branch is taken is determined at the time of execution of the branch instruction.

When the branch prediction is wrong, all the speculatively executed subsequent instructions are discarded, and execution needs to start over with correct subsequent instructions indicated by the outcome of an actually executed branch instruction, which results in performance loss. It is thus important to improve the accuracy of branch prediction in order to improve the performance of processors.

The branch prediction technique includes a method that uses a global history indicating branch directions for N (N: positive integer) respective branch instructions executed before an instruction for which the branch is predicted. A piecewise-linear method predicts a branch direction for an instruction based on both the global history of N previous branch instructions and N weighting factors indicative of correlations between a branch direction for the instruction subject to prediction and branch directions for the N previous branch instructions. In so doing, weighting factors that reflect instruction execution paths to the instruction subject to branch prediction are used as the N weighting factors, thereby improving the accuracy of branch prediction.

The piecewise-linear method uses N weight tables. Each weight table stores weighting factors for respective indexes, each of which is constituted by a portion of an instruction address. Each time branch prediction is performed for a branch instruction, a portion of the instruction address of this branch instruction is used as an index to search in each of the N weight tables, thereby obtaining N weighting factors Wi (i=1 to N) with respect to the instruction subject to prediction. Each of the N weighting factors is multiplied by an outcome value X of branch prediction for the instruction subject to branch prediction (X is +1 when taken, and is −1 when not taken), so that these multiplication operations produce weighted outcomes Mi (=Wi·X). N flip-flops $BWSUM_i$ (i=1 to N) are provided in one-to-one correspondence with the N weight tables. The weighted outcome Mi is added to the value stored in the flip-flop $BWSUM_{i+1}$, followed by storing the result of addition in the flip-flop $BWSUM_i$. As an exception, $M_N$ without any change is stored in the flip-flop $BWSUM_N$.

As a result of the above-noted computation, $M_N$ stored in the flip-flop $BWSUM_N$ at the time of predicting a branch for a given branch instruction is first obtained, and, then, $M_{N-1}$ through $M_1$, which are computed for N−1 subsequent branch instructions subject to successive branch predictions, are successively added to the $M_N$. In the end, value SUM stored in the flip-flop $BWSUM_i$ has a value shown below.

$$SUM = M_N M_{N-1} + \ldots + M_2 + M_1$$

The stored value SUM at a given point in time is the sum of products obtained by multiplying N weighting factors Wi, corresponding to N previous branch instructions for which branch predictions were made, by the respective outcome values (i.e., +1 or −1) of branch predictions for these N branch instructions.

Further, another weight table having the same configuration as the N weight tables noted above is provided, and a portion of the instruction address of a current branch instruction subject to prediction is used to perform search in this weight table, thereby producing a weighting factor $W_0$ for the current branch instruction. In prediction of a branch direction, a positive value of $SUM+W_0$ corresponds to predicting "branch taken", and a negative value of $SUM+W_0$ corresponds to predicting "branch not taken".

The weighting factors Wi (i=1 to 20) are set to values representing positive correlations between a branch direction for an instruction subject to prediction and branch directions for the N previous branch directions. Namely, the stronger the tendency that the branch direction for an instruction subject to prediction and the branch direction for a previous branch instruction are the same direction rather than the opposite directions, the larger positive value the weighting factor becomes. Conversely, the stronger the tendency that the branch direction for an instruction subject to prediction and the branch direction for a previous branch instruction are the opposite directions rather than the same direction, the larger negative value the weighting factor becomes.

When calculating Mi, each weighting factor Wi is multiplied by the branch prediction outcome value (which is +1 when the branch is taken, and −1 when the branch is not taken). Accordingly, a bias toward the positive direction is given to SUM when the branch has been taken for a previous branch instruction having a high positive correlation, while a bias toward the negative direction is given to SUM when the branch has not been taken for a previous branch instruction having a high positive correlation. In contrast, a bias toward the negative direction is given to SUM when the branch has been taken for a previous branch instruction having a high negative correlation, while a bias toward the positive direction is given to SUM when the branch has not been taken for a previous branch instruction having a high negative correlation. The weighting factor $W_0$ for the instruction subject to prediction is set to a value representing a positive correlation with the value (+1 for branch taken and −1 for branch not taken) indicative of a previous branch direction for this instruction. Accordingly, the branch is likely to be taken for the instruction subject to prediction when $SUM+W_0$ is positive, and the branch is likely to be not taken for the instruction subject to prediction when $SUM+W_0$ is negative.

In the above-described computation, the processes performed for branch prediction purposes with respect to the instruction subject to prediction only involve retrieving the weighting factor $W_0$ from the weight table, adding the weighting factor $W_0$ to the value SUM stored in the flip-flop $BWSUM_1$, and comparing the result of addition with "0". The addition operation performed in this computation requires only one addition of two inputs, which enables the realization of branch prediction with one-cycle latency.

When wrong prediction is made in branch prediction, all the speculatively executed subsequent instructions are discarded, and execution needs to start over with correct subsequent instructions indicated by the outcome of an actually executed branch instruction. When this happens, the values stored in the previously-noted N flip-flops for storing intermediate computation results in the branch prediction unit turn out to be wrong values as a result of wrong processes speculatively performed based on the branch instruction. Accordingly, the values stored in the N flip-flops cannot be used for branch prediction that is to be performed with respect to a correct subsequent instruction and next following instructions.

In the related-art piecewise-linear methods, a history of N previous completed branch instructions is retained, and this history is used to recalculate the values of the N flip-flops to be used for branch prediction performed with respect to a correct subsequent instruction and next following instructions. Specifically, the arithmetic operations of calculating the sum of products obtained by multiplying N completed branch outcome values by the N respective weighting factors Wi corresponding to the N previous completed branch instructions is performed the second time when wrong branch prediction is detected. With this arrangement, the addition of two inputs needs to be performed N−1 times when wrong branch prediction is detected, resulting in an increase in the branch prediction latency.

Related-Art Documents

Patent Document

[Patent Document 1] Japanese Laid-Open Patent Publication No. H6-089173
[Patent Document 2] Japanese Laid-Open Patent Publication No. 2017-027451

Non-Patent Document

[Non Patent Document 1]
S. McFarling, "Combining Branch Predictors", WRL Technical Note TN-36 (1993)
[Non Patent Document 2]
E. Sprangle and R. S. Chappell and M. Alsup and Y. N. Patt, "The Agree Predictor: A Mechanism for Reducing Negative Branch History Interference", International Symposium on Computer Architecture—ISCA, pp. 284-291, 1997
[Non Patent Document 3]
D. A. Jiménez, Calvin Lin, "Dynamic Branch Prediction with Perceptrons," Proceedings of the 7th International Symposium on High-Performance Computer Architecture, p. 197, Jan. 20-24, 2001
[Non Patent Document 4]
D. A. Jiménez, "Neural methods for dynamic branch prediction", ACM Transactions on Computer Systems (TOCS) Volume 20 Issue 4, November 2002 Pages 369-397

[Non Patent Document 5]
D. A. Jiménez, "Fast Path-Based Neural Branch Prediction," Proceedings of the 36th annual IEEE/ACM International Symposium on Microarchitecture, p. 243, Dec. 3-5, 2003
[Non Patent Document 6]
D. A. Jimenez, "Piecewise Linear Branch Prediction," Proceedings of the 32nd annual international symposium on Computer Architecture, p. 382-393, Jun. 4-8, 2005
[Non Patent Document 7]
D. A. Jiménez, "Oh-snap: Optimized hybrid scaled neural analog predictor". In Proceedings of the 3rd Championship on Branch Prediction, <http://www.jilp.org/jwac-2/>, 2011

SUMMARY

According to an aspect of the embodiment, an arithmetic processing apparatus includes weight tables each configured to store weighting factors in one-to-one correspondence with indexes that are associated with instruction addresses, a first weight arithmetic unit configured to perform a first operation and a second operation based on the weighting factors retrieved from the weight tables in response to an instruction fetch address, the first operation producing at least one first value that serves as a basis for branch prediction for the instruction fetch address, the second operation producing second values that serve as a basis for future branch prediction, and a second weight arithmetic unit configured to perform, in parallel with the second operation, a third operation equivalent to the second operation based on the weighting factors retrieved from the weight tables in response to a completed-instruction address of a completed branch instruction, the third operation producing third values that are to serve as substitute values or update values for the second values when a wrong branch prediction is detected, wherein the second values stored in the first weight arithmetic unit are replaced with the third values upon detection of a wrong branch prediction.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a drawing illustrating pipeline operations in branch prediction;
FIG. 4 is a drawing illustrating the way the instruction fetches are canceled when a branch prediction result indicates "branch taken"

DESCRIPTION OF EMBODIMENTS

In the following, embodiments of the present invention will be described with reference to the accompanying drawings.

In the following, embodiments of the invention will be described with reference to the accompanying drawings. In these drawings, the same or corresponding elements are referred to by the same or corresponding numerals, and a description thereof will be omitted as appropriate.

Figure 1:
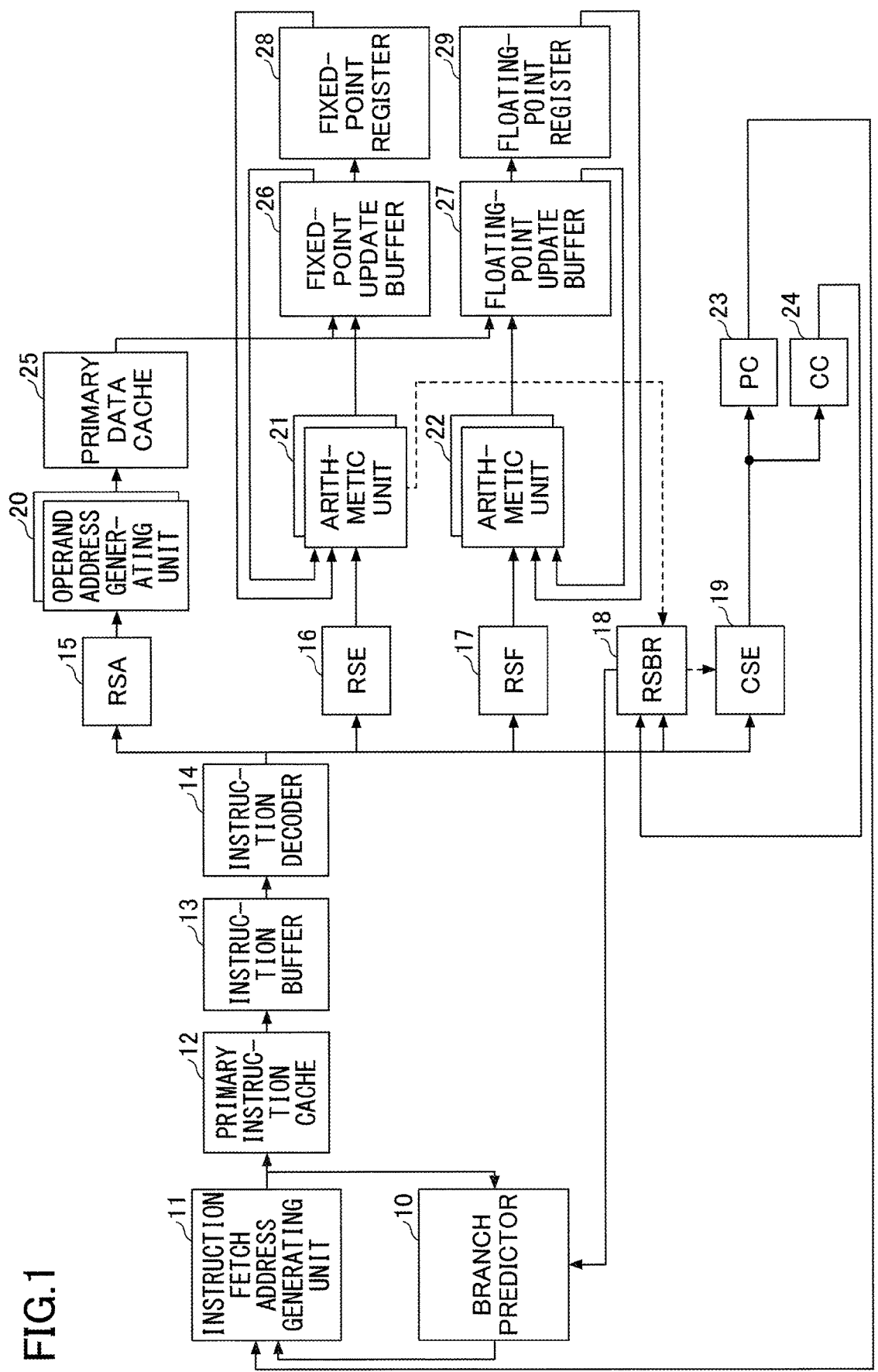
FIG. 1 is a drawing illustrating an example of the configuration of a processor.

FIG. 1 is a drawing illustrating an example of the configuration of a processor. In FIG. 1 and the subsequent similar drawings, boundaries between functional or circuit blocks illustrated as boxes basically indicate functional boundaries, and may not correspond to separation in terms of physical positions, separation in terms of electrical signals, separation in terms of control logic, etc. Each functional or circuit block may be a hardware module that is physically separated from other blocks to some extent, or may indicate a function in a hardware module in which this and other blocks are physically combined together.

The processor shown in FIG. 1 includes a branch predictor 10, an instruction fetch address generating unit 11, a primary instruction cache 12, an instruction buffer 13, and an instruction decoder 14. The processor further includes an RSA (Reservation Station for Address Generate) 15, an RSE (Reservation Station for Execute) 16, an RSF (Reservation Station for Floating) 17, and an RSBR (Reservation Station for Branch) 18. The processor further includes a CSE (Commit Stack Entry) 19, an operand address generating unit 20, an arithmetic unit 21, an arithmetic unit 22, a next program counter (PC) 23, and a condition code register (CC) 24. The processor further includes a primary data cache 25, a fixed-point update buffer 26, a floating-point update buffer 27, a fixed-point register 28, and a floating-point register 29.

The instruction fetch address generating unit 11 includes a program counter for storing an instruction fetch address, and successively generates instruction fetch addresses by increasing the stored value of the program counter by a constant increment. One fetch line read by one fetch address may contain only one instruction, or may contain a plurality (e.g., eight) of instructions. The number of instructions included in a fetch line is not limited to a particular number.

The branch predictor 10 receives an instruction fetch address output from the instruction fetch address generating unit 11 to perform branch prediction concurrently with instruction fetch. The branch predictor 10 performs branch prediction based on the received instruction fetch address, and returns the branch destination address (target address) and the branch direction indicative of either "branch taken" or "branch not taken" to the instruction fetch address generating unit 11. If the branch prediction is "branch taken", the instruction fetch address generating unit 11 selects the branch destination address predicted by the branch predictor 10 as the next instruction fetch address. The configuration and operation of the branch predictor 10 will be described later.

The instruction fetch address generating unit 11 issues the instruction fetch address and an instruction fetch request to the primary instruction cache 12. In response, one or more instructions of the fetch line corresponding to the instruction fetch address are read from the primary instruction cache 12, and are stored in the instruction buffer 13.

The instruction buffer 13 supplies the stored instructions to the instruction decoder 14 in the order of executions in the program, i.e., in the "in-order" sequence. The instruction decoder 14 decodes the instructions in the order of execution in the program, i.e., in the in-order sequence, followed by issuing instructions in the in-order sequence. Based on this instruction issuance process, the instruction decoder 14 creates, according to the type of instruction decoded, an entry indicating each instruction in the RSA 15, the RSE 16, the RSF 17, or the RSBR 18, each of which is a queue-structure storage.

The RSA 15 is a reservation station that controls the created entries, in an out-of-order sequence without being restricted by the order of instructions in the program, in order to generate a main memory operand address for executing load or store instructions. Based on the control by the RSA 15, the operand address generating unit 20 generates an access address, so that a load instruction or store instruction is executed with respect to this address in the primary data cache 25. Data read by the load instruction is stored in a designated register in the fixed-point update buffer 26 or in the floating-point update buffer 27.

The RSE 16 is an reservation station that controls the created entries in an out-of-order sequence to perform a specified fixed-point arithmetic operation with respect to data in a specified register. The RSE 16 checks dependencies between the registers accessed by instructions to be executed, and determines whether the arithmetic unit serving as execution resources can execute an instruction, based on the update status of registers having dependencies and the execution status of instructions using the same execution resources of the arithmetic unit 21. If executable, the RSE 16 outputs information necessary for executing instructions, such as register numbers and operand addresses, to each arithmetic unit 21 in an out-of-order sequence, without regard to the order in which the instructions are received. Based on the control by the RSE 16, the arithmetic unit 21 performs a specified fixed-point arithmetic operation with respect to data in specified registers in the fixed-point update buffer 26 and the fixed-point register 28, followed by storing the result of arithmetic operation in a designated register in the fixed-point update buffer 26.

The RSF 17 is an reservation station that controls the created entries in an out-of-order sequence to perform a specified floating-point arithmetic operation with respect to data in a specified register. The RSF 17 outputs information necessary for executing instructions such as register numbers and operand addresses to each arithmetic unit 22 in an out-of-order sequence in the same or similar manner as in the case of the RSE 16 described above. Based on the control by the RSF 17, the arithmetic unit 22 performs a specified floating-point arithmetic operation with respect to data in specified registers in the floating-point update buffer 27 and the floating-point register 29, followed by storing the result of arithmetic operation in a designated register in the floating-point update buffer 27.

The RSBR 18 is a reservation station for executing branch instructions. The RSBR 18 receives data indicative of the types of branch instructions from the instruction decoder 14, and also receives the branch instruction addresses from the instruction address buffer, followed by storing these data for respective branch instructions. Subsequently, the RSBR 18 receives from the arithmetic unit 21 the results of arithmetic operations that are to serve as branch destination addresses and branch conditions. The RSBR 18 determines that the branch is taken if the obtained arithmetic results satisfy branch conditions, and determines that the branch is not taken if the obtained arithmetic results do not satisfy branch conditions, thereby making a determination on the branch direction.

The RSBR 18 also determines whether the actual branch address and branch direction indicated by the results of the above-noted arithmetic operations match the branch address and the branch direction determined at the time of branch prediction, and also controls the order in which branch instructions are executed. The RSBR 18, which registers the branch direction and the branch destination address determined at the time of branch prediction when an entry is created, checks a match between the arithmetic operation results and the prediction, followed by replacing the entry based on the arithmetic operation results. When the arithmetic operation results and the prediction are in agreement, the RSBR 18 outputs a branch-instruction completion notice to the CSE 19. When the arithmetic operation results and the prediction are not in agreement, i.e., in the case of a wrong branch prediction, the RSBR 18 outputs to the CSE 19 a branch-instruction completion notice together with a request for cancelling subsequent instructions, and also outputs an instruction re-fetch request and an instruction re-fetch address to the instruction fetch address generating unit 11.

The instruction decoder 14 also assigns instruction identifiers to all decoded instructions, and sends the instruction identifiers to the CSE 19 in the order of instructions. The CSE 19 includes a queue structure storage and a completion processing circuit. The queue structure storage stores the instruction identifiers of decoded instructions in the order in which the instructions are executed. The completion processing circuit performs a commit process based on information about the queue and an operation completion notice sent from each processing pipe. The instruction identifier of an instruction decoded by the decoder is stored in the queue in the CSE 19, waiting for a completion notice from the processing pipes. When a reservation station sends to the CSE 19 a completion notice regarding an instruction executed in an out-of-order sequence, the completion processing circuit of the CSE 19 releases, in the in-order sequence, the instruction corresponding to the completion notice among the instructions waiting for completion in the queue, thereby finalizing the completion.

Resources are updated with respect to the instruction that is released from the CSE 19 and whose completion is finalized. In the case of a load instruction or an arithmetic instruction, data in the fixed-point update buffer 26 or in the fixed-point update buffer 26 is transferred to the fixed-point register 28 or to the floating-point register 29, which causes the results of executing the instruction to be reflected in a register that is accessible from software. At the same time, the value of the next program counter 23 is increased by an appropriate increment to point to the address of an instruction next following the instruction that is completed and released. The condition code register 24 also stores a code indicating the result of executing a branch instruction. The next program counter 23 is a program counter used in special cases such as when an interrupt occurs, and is not used during the orderly running of programs.

Figure 2:
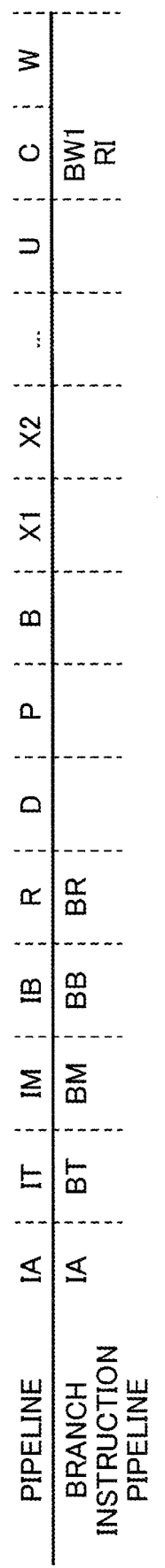
FIG. 2 is a drawing illustrating each stage of a pipeline for executing instructions.

FIG. 2 is a drawing illustrating each stage of a pipeline for executing instructions. The upper row of FIG. 2 is an example of the instruction execution pipeline of the processor illustrated in FIG. 1. The lower row is an example of the branch prediction pipeline of the processor illustrated in FIG. 1. As is illustrated in FIG. 2, instruction execution and branch prediction proceed concurrently with each other in respective pipelines.

The operation at each stage of the pipeline for executing instructions is as follows.

IA: determine an instruction fetch address and send the address to the primary cache
IT: access a cache TLB
IM: check a match for TLB tags
IB: receive an instruction from the primary cache and send the instruction to the instruction buffer
R: receive the instruction in the instruction buffer and check an exception or the like in an instruction fetch phase
D: decode the instruction
P: determine an instruction to be issued from the reservation station to an arithmetic unit
B: issue data for an arithmetic operation to the arithmetic unit
X1: perform the arithmetic operation at the arithmetic unit
U: send an arithmetic-operation-completion notice to the CSE
C: determine a commit
W: update resources The operation at each stage of the pipeline for branch prediction is as follows.

IA: determine an instruction fetch address and send the address to the branch predictor
BT: retrieve weighting factors from weight tables and perform a weighting operation for the instruction subject to prediction
BM: branch prediction
BB: transfer the results of branch prediction
BR: perform weighting operations for subsequent instructions subject to branch prediction
BW1: update weight tables
RI: return to an instruction upon a wrong branch prediction FIG. 3 is a drawing illustrating pipeline operations in branch prediction. In an IA cycle, the branch predictor 10 receives an instruction fetch address from the instruction fetch address generating unit 11. In a BT cycle, the branch predictor 10 retrieves weighting factors from weight tables, and performs a weighting operation for the instruction subject to branch prediction. In a BM cycle, the branch predictor 10 completes prediction indicative of either "branch taken" or "branch not taken".

In a pipelined instruction fetch, instruction fetch addresses generally proceed according to the instruction sequence. In FIG. 3, stages executed for first to fourth instructions fetched at first to fourth respective instruction fetch cycles IFC1 to IFC4 are sequentially illustrated in the same row in the horizontal direction. In FIG. 3, the instruction fetch address in the second instruction fetch cycle IFC2 is equal to the sum of the instruction fetch address in the first instruction fetch cycle IFC1 and the fetch line size. Until the BM cycle in which a branch prediction result is obtained, instruction fetches continue to be speculatively performed according to the instruction sequence.

FIG. 4 is a drawing illustrating the way the instruction fetches are canceled when a branch prediction result indicates "branch taken". If the branch predictor 10 produces a branch prediction result indicative of branch taken in the BM cycle, the instruction fetches speculatively performed according to the instruction sequence are canceled. In FIG. 4, a branch prediction result obtained in the BM cycle for the first instruction fetched in the first instruction fetch cycle IFC1 indicates branch taken. Execution of the second and third instructions (i.e., instructions fetched in the instruction fetch cycles IFC2 and IFC3) which are speculatively fetched according to the instruction sequence prior to this BM cycle is cancelled in the BM cycle. Instruction fetch in the fourth instruction fetch cycle IFC4 is performed with respect to the branch destination address that is predicted for the first instruction, which is fetched in the first instruction fetch cycle IFC1.

Figure 5:
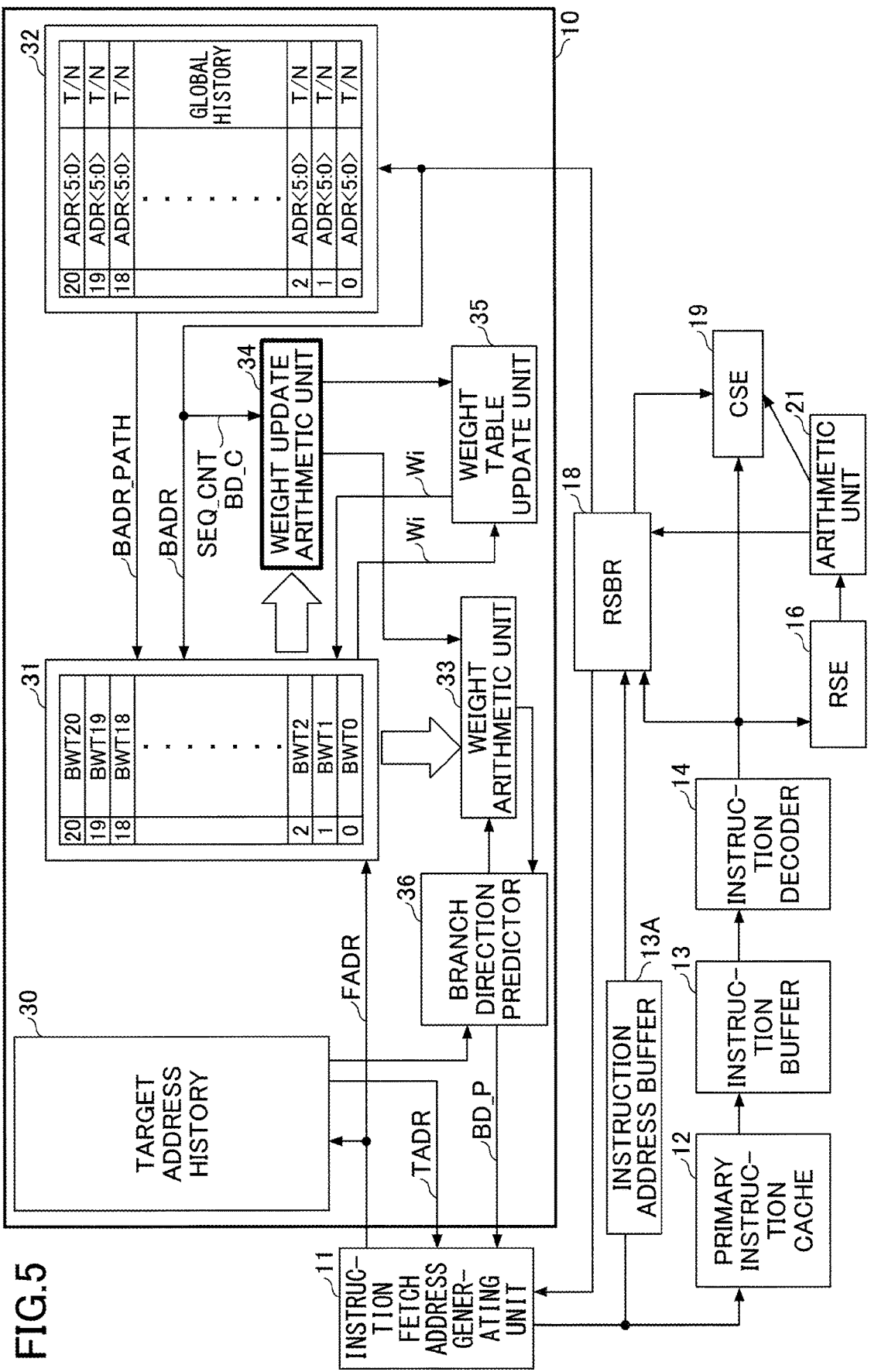
FIG. 5 is a drawing illustrating an example of the configuration of a branch predictor and connections thereof with neighboring units.

FIG. 5 is a drawing illustrating an example of the configuration of the branch predictor 10 and connections thereof with neighboring units. The branch predictor 10 illustrated in FIG. 5 includes a target address history 30, a weight table unit 31, a completed branch instruction path history 32, a weight arithmetic unit 33, a weight update arithmetic unit 34, a weight table update unit 35, and a branch direction predictor 36.

As was previously described, the RSBR 18 receives data indicative of the types of branch instructions from the instruction decoder 14, and also receives the branch instruction addresses from an instruction address buffer 13A, followed by storing these data for respective branch instructions. When the result of actual execution of a branch instruction matches the branch prediction result, the RSBR 18 supplies information on the completed branch instruction to the branch predictor 10 while outputting a branch instruction completion notice to the CSE 19. When the result of actual execution of the branch instruction does not match the branch prediction result, the RSBR 18 outputs a request for cancelling subsequent instructions together with a branch instruction completion notice to the CSE 19, and also outputs an instruction re-fetch request and an instruction re-fetch address to the instruction fetch address generating unit 11, together with supplying information on the completed branch instruction to the branch predictor 10.

The branch predictor 10 performs branch prediction with respect to a branch instruction contained in the fetch line at an instruction fetch address FADR supplied from the instruction fetch address generating unit 11. Namely, a branch instruction included in the fetch line at the instruction fetch address FADR is subject to branch prediction. The instruction fetch address FADR supplied to the branch predictor 10 is supplied to the target address history 30 and to the weight table unit 31.

The target address history 30 stores a tag, a target address, and a flag corresponding to each of the plurality of indexes, with a portion of the supplied instruction fetch address FADR being treated as an index. When the instruction fetch address FADR is supplied to the target address history 30, a portion of the instruction fetch address FADR is used as an index to obtain a tag, a target address, and a flag corresponding to the index. In the target address history 30, a check is made as to whether the obtained tag matches the portion, not used as the index, of the instruction fetch address FADR. The result of check is supplied to the branch direction predictor 36.

If the tag matches, the target address history 30 supplies a target address TADR to the instruction fetch address generating unit 11. The target address TADR stored in the target address history 30 is updated with information about the branch destination address of the completed branch instruction when the information about the completed branch instruction is supplied from the RSBR 18 to the branch predictor 10.

If the tag matches, the branch direction predictor 36 ascertains that a branch instruction is included in the fetch line at the instruction fetch address FADR, followed by outputting to the instruction fetch address generating unit 11 a predicted branch direction BD_P indicative of either "branch taken" or "branch not taken" determined by the branch prediction operation, which will be described later. If the tag does not match, the branch direction predictor 36 supplies to the instruction fetch address generating unit 11 the predicted branch direction BD_P having a value indicative of "branch not taken".

As was previously described, one fetch line read by one instruction fetch address FADR may contain only one instruction, or may contain a plurality (e.g., eight) of instructions. When a plurality of instructions are included, tag matching may be performed with respect to each of the plurality of tags for the instruction fetch address FADR. A plurality of target addresses TADR may be identified based on the result of checking tag matches with respect to the respective tags. Further, as will be described later, each weight table may store a plurality of weighting factors corresponding to one index, and computations such as branch prediction may be concurrently performed for the respective weighting factors. Only one or more branch prediction results corresponding to one or more tags determined to match may be supplied to the instruction fetch address generating unit 11 according to the results of determining tag matches for the respective tags. In this case, if there is even one branch instruction indicative of "branch taken" in the fetch line corresponding to one instruction fetch address FADR, the branch prediction result for this instruction fetch address FADR is considered to be "branch taken".

In the following description, the operation of the branch predictor 10 will be described with reference to one instruction included in one fetch line at one instruction fetch address FADR and one weighting factor corresponding thereto, unless otherwise required.

The weight table unit 31 includes weight tables that store weighting factors in one-to-one correspondence with indexes corresponding to respective instruction addresses. The weight table unit 31 includes 21 weight tables BWT0 through BWT20 for performing the piecewise-linear operations previously described. The weight tables may have the same configuration. Each weight table stores weighting factors for respective indexes, each of which is constituted by a portion of an instruction address. Supplying the instruction fetch address FADR to the weight table unit 31 causes a portion of the instruction fetch address FADR to serve as an index, and causes a weighting factor $W_0$ corresponding to the index to be retrieved from a weight table BWT0. The retrieved weighting factor $W_0$ is supplied to the weight arithmetic unit 33.

The weight arithmetic unit 33 has 20 flip-flops $BWSUM_i$ (i=1 to 20) in one-to-one correspondence with the 20 weight tables BWT1 through BWT20. The weight arithmetic unit 33 adds the weighting factor $W_0$ to a stored value SUM of the flip-flop $BWSUM_1$, followed by supplying the result SUM+$W_0$ to the branch direction predictor 36. The branch direction predictor 36 predicts "branch taken" if SUM+$W_0$ is positive, and predicts "branch not taken" if SUM+$W_0$ is negative.

After the cycle in which the above-noted prediction of a branch direction is performed, the portion of the instruction fetch address FADR is used as an index in the weight table unit 31 to search in the 20 weight tables BWT1 through BWT20 in parallel. With this arrangement, 20 weighting factors Wi (i=1 to 20) corresponding to the instruction fetch address FADR are retrieved from the 20 weight tables BWT1 through BWT20, respectively. The 20 retrieved weighting factors Wi (i=1 to 20) are supplied to the weight arithmetic unit 33.

The weight arithmetic unit 33 multiplies each of the 20 weighting factors Wi (i=1 to 20) by an outcome value X of branch prediction for the instruction fetch address FADR (X is +1 when the branch is taken, and is −1 when the branch is not taken), thereby obtaining weighted outcomes Mi (=Wi·X) through these multiplications. The weight arithmetic unit 33 adds the above-noted weighted outcome Mi to the value stored in the flip-flop $BWSUM_{i+1}$, followed by storing the obtained sum in the flip-flop $BWSUM_i$. As an exception, $M_{20}$ without any change is stored in the flip-flop $BWSUM_{20}$. An action of storing values in the flip-flops is performed only when the previously-noted tag matches the current instruction fetch address FADR. Namely, the stored value of each flip-flop $BWSUM_i$ is updated only for a fetch line that includes a branch instruction.

As a result of the above-noted calculations, $M_{20}$ is first stored in the flip-flop $BWSUM_{20}$ for a fetch line including a branch instruction, and, then, $M_{19}$ through $M_1$ calculated for the 19 subsequent fetch lines including a branch instruction sequentially subject to branch prediction are successively added to $M_{20}$. In the end, the value SUM stored in the flip-flop $BWSUM_1$ has a value shown below.

$$SUM = M_{20} + M_{19} + \ldots + M_2 + M_1$$

The stored value SUM at a given point in time is the sum of products obtained by multiplying 20 weighting factors Wi, corresponding to the 20 previous instruction fetch addresses FADR including a branch instruction, by the 20 respective outcome values (i.e., +1 or −1) of branch predictions. This value SUM will be used to calculate the value $SUM+W_0$ when performing branch prediction for the next instruction fetch address FADR.

As will be described below, the 20 previous instruction fetch addresses FADR for which branch prediction has been performed are selected by excluding the 3 immediately preceding instruction fetch addresses FADR (i.e., the 3 most recent fetch lines). This is because, when the timing of each calculation stage of branch prediction is taken into account, excluding the 3 immediately preceding fetch lines from calculation makes it possible to complete the calculation of the SUM stored in the flip-flop $BWSUM_1$ before the computation for branch prediction using this value. Namely, at the time of the BT stage of the fetch line subject to branch prediction (i.e., the stage in which a weighting operation for the instruction subject to prediction is performed), the stored value of the flip-flop $BWSUM_1$ has barely been determined for the 4th fetch line preceding the fetch line subject to branch prediction.

Figure 6:
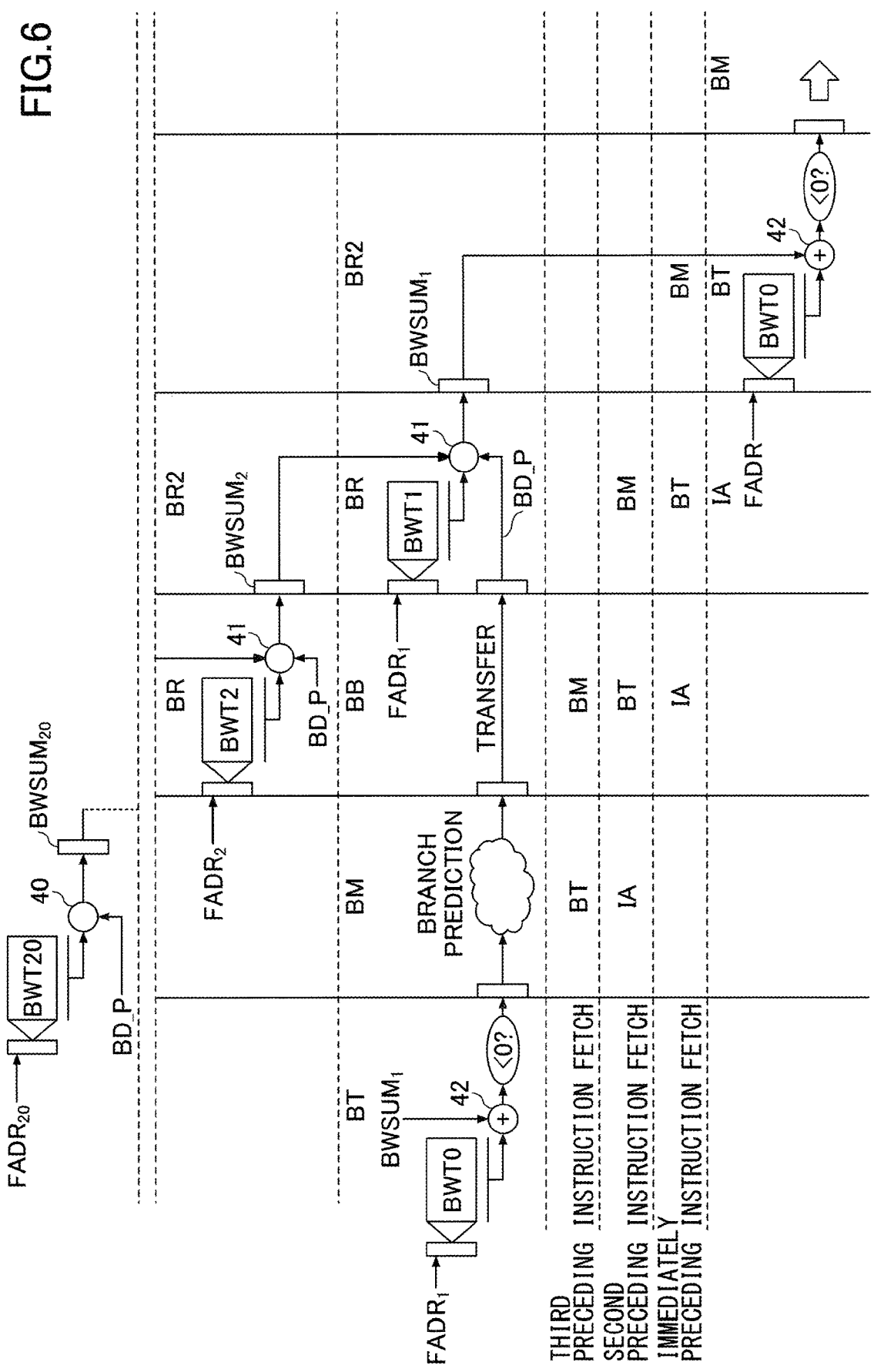
FIG. 6 is a drawing schematically illustrating the progress of computation by a weight arithmetic unit.

FIG. 6 is a drawing schematically illustrating the progress of computation by the weight arithmetic unit 33. In FIG. 6, IA, BT, BM, BB, BR, and the like are stages of the pipeline for branch prediction previously described. FADR is an instruction fetch address that is currently subject to branch prediction. $FADR_1$ is the instruction fetch address of the last fetch line including a branch instruction for which branch prediction has been made, when the 3 immediately preceding instruction fetch addresses prior to the instruction fetch address FADR currently subject to branch prediction are excluded. $FADR_2$ is the instruction fetch address of the last fetch line including a branch instruction for which branch prediction was made prior to $FADR_1$. $FADR_{20}$ is the instruction fetch address of the 19th preceding fetch line including a branch instruction for which branch prediction was made prior to $FADR_1$.

An arithmetic unit 40, which is provided for the weight table BWT20, multiplies the weighting factor $W_{20}$ from the weight table BWT20 by the predicted branch direction BD_P. The result of multiplication is stored in the flip-flop $BWSUM_{20}$. An arithmetic unit 41, which is provided for each of the weight tables BWTi (i=1 to 19), multiplies the weighting factor Wi from the weight table BWTi by the predicted branch direction BD_P, followed by adding the multiplication result to the stored value of the flip-flop $BWSUM_{i+1}$. The result of addition is stored in the flip-flop $BWSUM_i$.

As a result of the above-noted computations successively performed for the instruction fetch addresses $FADR_{20}$ through $FADR_1$, the value stored in flip-flop $BWSUM_1$ at the end of the BR stage of the branch prediction for $FADR_1$ becomes the value SUM that is to be used in branch prediction for the next FADR. An arithmetic unit 42, which is provided for the weight table BWT0, adds the value SUM from the flip-flop $BWSUM_1$ to the weighting factor $W_0$ from the weight table BWT0.

Figure 7:
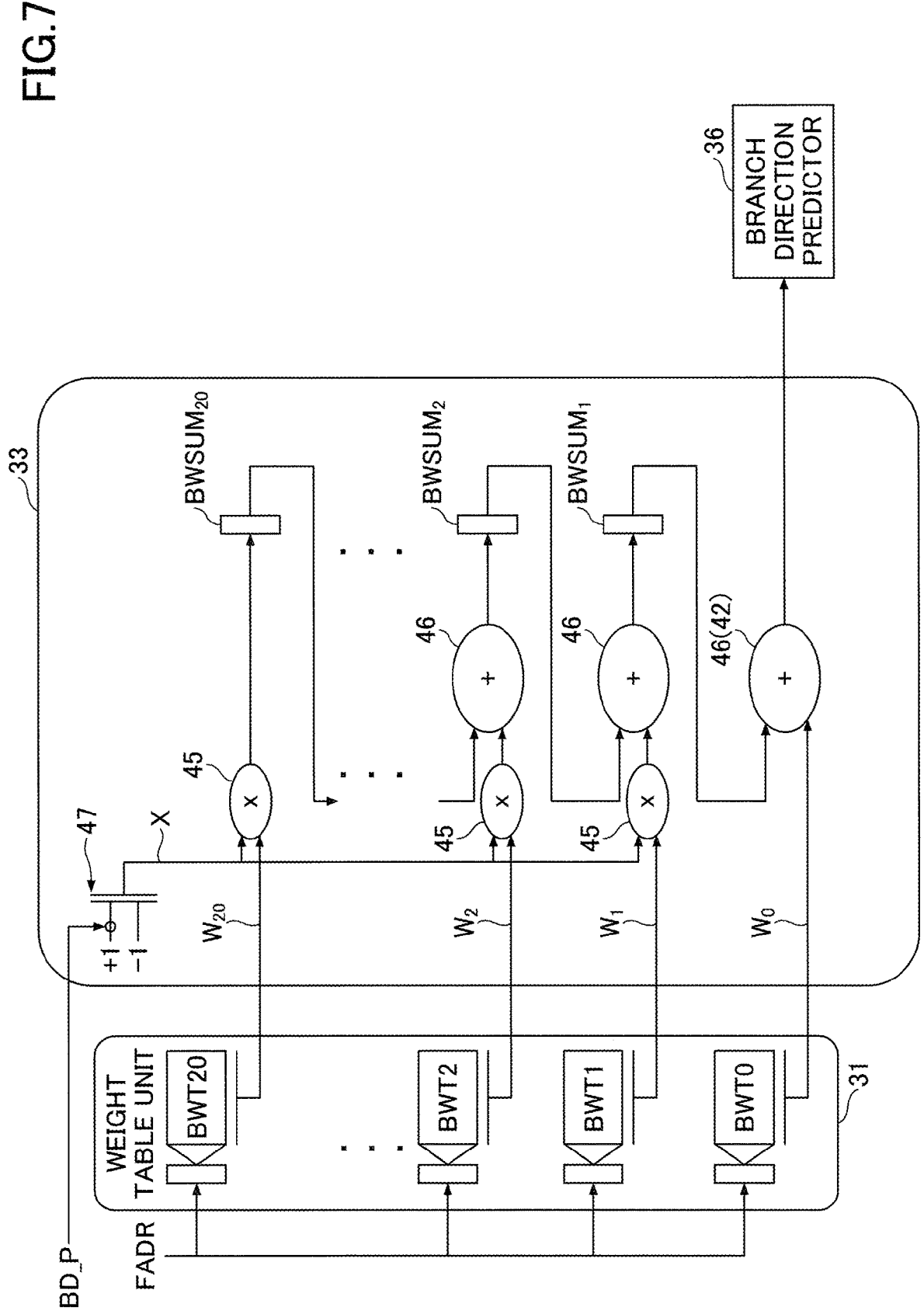
FIG. 7 is a drawing illustrating an example of the configuration of the weight arithmetic unit.

FIG. 7 is a drawing illustrating an example of the configuration of the weight arithmetic unit 33. The weight arithmetic unit 33 illustrated in FIG. 7 includes 20 multipliers 45, 20 adders 46, 20 flip-flops $BWSUM_1$ to $BWSUM_{20}$, and a selector circuit 47. The selector circuit 47 produces the outcome X that assumes +1 if the branch is taken and −1 if the branch is not taken, in response to the branch direction signal BD_P.

Each of the multipliers 45 multiplies the value X by the weighting factor Wi retrieved from the corresponding weight table BWTi (i=1 to 20). Each of the adders 46 adds the result of multiplication of the value X and the weight Wi retrieved from the weight table BWTi (i=1 to 19) to the stored value of the flip-flop $BWSUM_{i+1}$, followed by updating the stored value of the flip-flop $BWSUM_i$ with the result of addition. As for the weighting factor $W_0$ from the weight table BWT0, the adder 46 (i.e., the arithmetic unit 42 illustrated in FIG. 6) adds the weighting factor $W_0$ to the stored value of the flip-flop $BWSUM_1$. The result of addition is supplied to the branch direction predictor 36.

Figure 8:
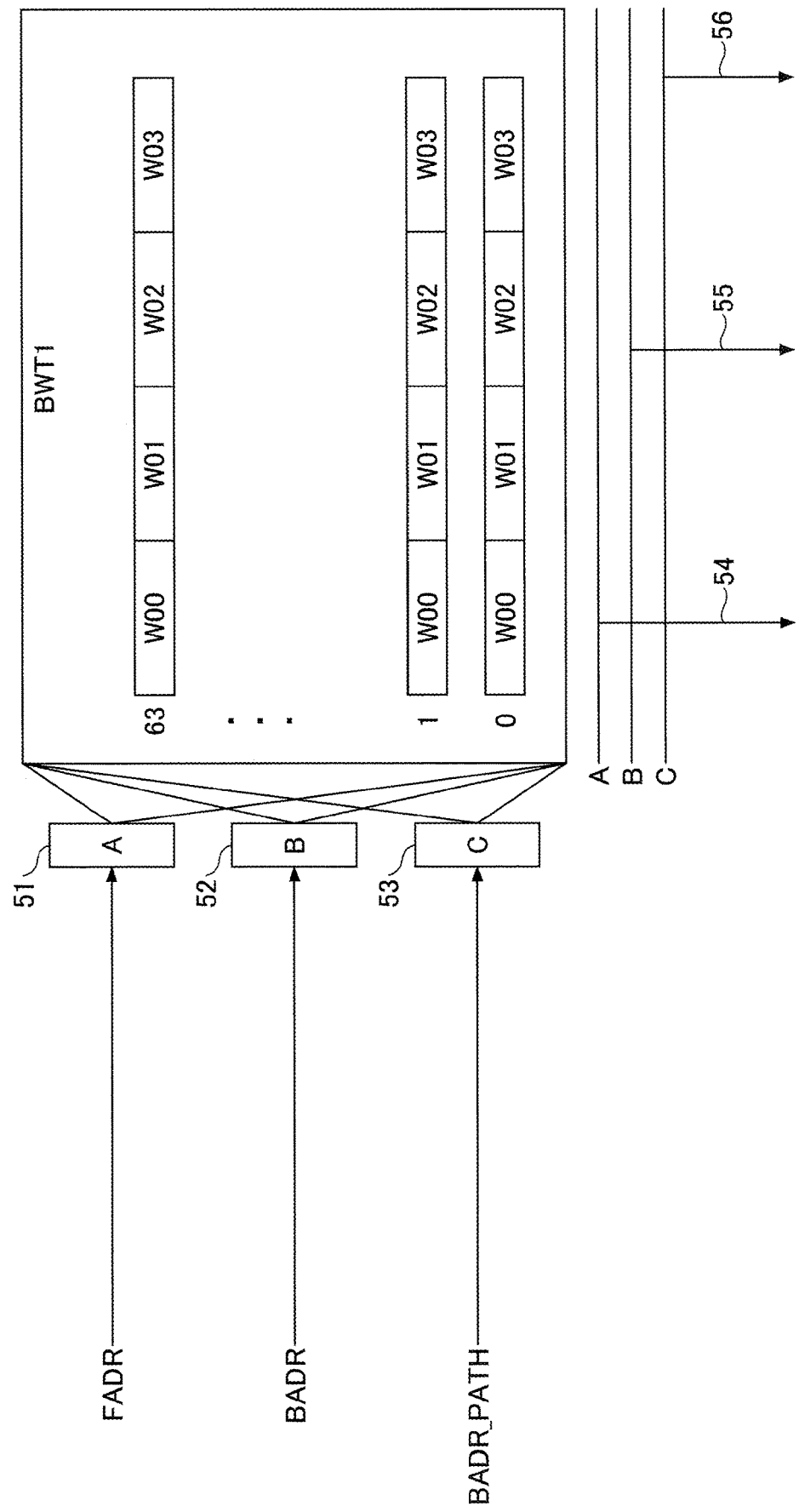
FIG. 8 is a drawing illustrating an example of the configuration of a weight table.

FIG. 8 is a drawing illustrating an example of the configuration of a weight table. FIG. 8 illustrates the weight table BWT1 as a representative of the 21 weight tables BWT0 through BWT20. The weight tables BWT0 through BWT20 may have the same configuration.

The weight table BWT1 stores 4 weighting factors W00 through W03 for each of the 64 indexes. The index corresponds to a portion of the instruction address, and may correspond to six address bits that are part of the instruction address, for example. Specifically, the lowest-order bit that changes in response to successive increases in the instruction fetch address FADR may correspond to the least significant bit of the index.

As was previously described, one fetch line retrieved by one fetch address may contain multiple instructions. In the case of multiple instructions being included, multiple branch predictions may be performed for one fetch line. In the example of the weight table illustrated in FIG. 8, 4 weighting factors are stored for each index. With this arrangement, supplying the instruction fetch address FADR causes 4 weighting factors corresponding to an index matching the instruction fetch address to be retrieved. For these 4 weighting factors, respective weighting operations previously described may be performed in parallel, thereby producing 4 prediction results. It is not essential for one fetch line to be associated with a plurality of weighting factors. The configuration may be such that one fetch line is associated with one weighting factor, for example.

The weight table BWT1 has a three-port configuration. The instruction fetch address FDAR is applied to an input-A port 51. In response to the input into the input-A port 51, 4 weighting factors are output from an output-A port 54. These weighting factors are supplied to the weight arithmetic unit 33, and are used in prediction computation performed with respect to the instruction fetch address FDAR subject to prediction.

An address BADR of a fetch line containing a completed branch instruction is applied to an input-B port 52. In response to the input into the input-B port 52, 4 weighting factors are output from an output-B port 55. These weighting factors are supplied to the weight update arithmetic unit 34, and are used to calculate data that are to be used for updating the flip-flops $BWSUM_i$ (i=0 to 20) of the weight arithmetic unit 33 when a wrong branch prediction is detected.

An address BADR PATH of one of a series of fetch lines (i.e., past branch instruction execution path) containing a completed branch instruction stored in the completed branch instruction path history 32 is applied to an input-C port 53. In response to the input into the input-C port 53, 4 weighting factors are output from an output-C port 56. These weighting factors are supplied to the weight table update unit 35 to be subject to weighting factor update.

Figure 9:
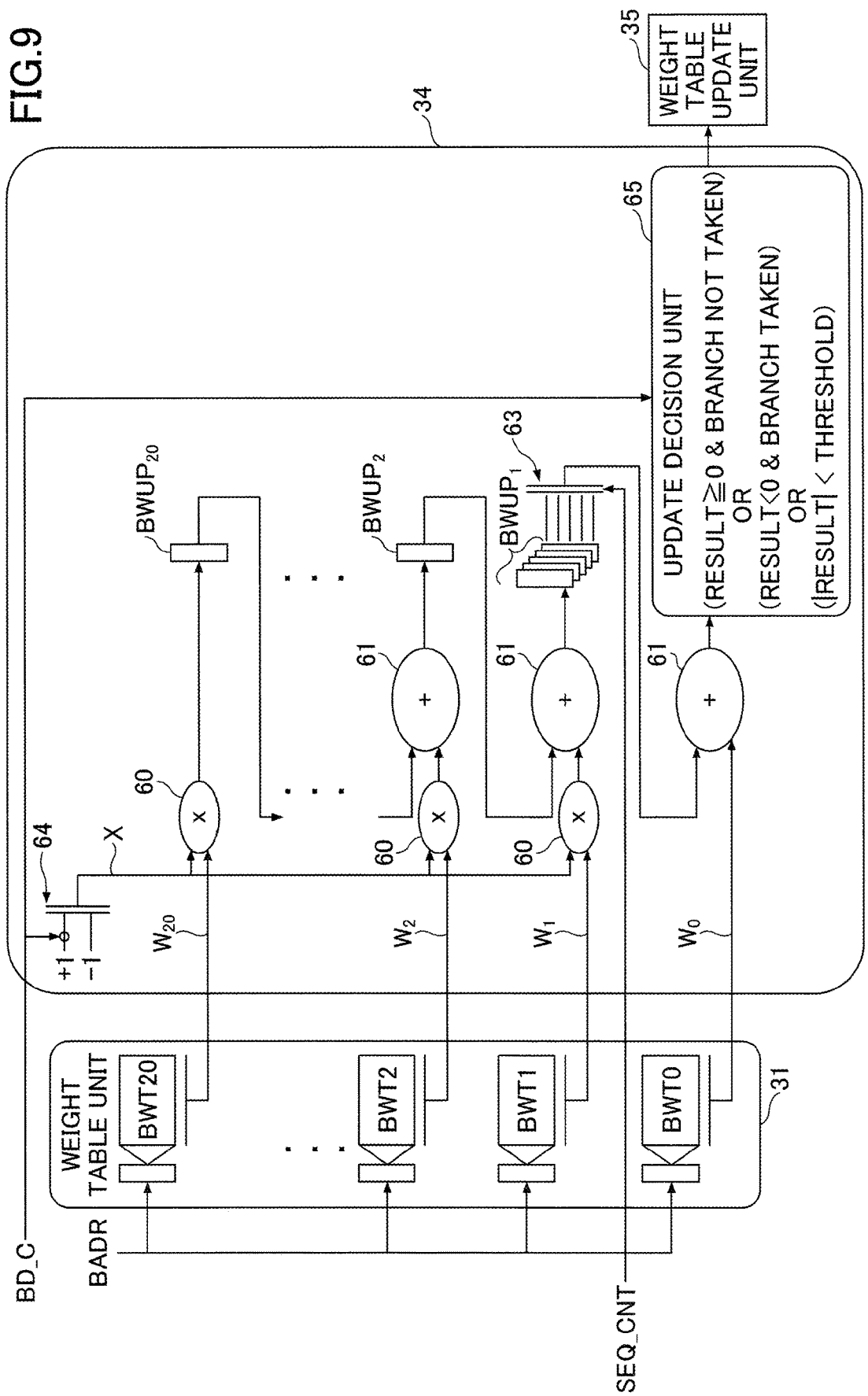
FIG. 9 is a drawing illustrating an example of the configuration of a weight update arithmetic unit.

FIG. 9 is a drawing illustrating an example of the configuration of the weight update arithmetic unit 34. The weight update arithmetic unit 34 illustrated in FIG. 9 includes 20 multipliers 60, 20 adders 61, 20 flip-flops $BWUP_1$ through $BWUP_{20}$, a selector circuit 63, a selector circuit 64, and an update decision unit 65.

The weight update arithmetic unit 34 have a similar configuration to the weight arithmetic unit 33 illustrated in FIG. 7, and performs similar weighting operations. However, the weighting factors subject to calculation in the weight update arithmetic unit 34 do not correspond to the instruction fetch address FADR, but correspond to the fetch line address BADR of a completed branch instruction reported from the RSBR 18.

The stored values of the flip-flops $BWSUM_1$ through $BWSUM_{20}$ in the weight arithmetic unit 33 are calculated for each fetch line including a branch instruction at the time of instruction fetch. In contrast, the stored values of the flip-flops $BWUP_1$ through $BWUP_{20}$ in the weight update arithmetic unit are calculated for each fetch line including a completed branch instruction. Namely, the stored values of the flip-flops $BWUP_1$ through $BWUP_{20}$ in the weight update arithmetic unit 34 are calculated in the same manner as the stored values of the flip-flops $BWSUM_1$ through $BWSUM_{20}$ in the weight arithmetic unit 33, but are calculated for a different point in time. These stored values of the flip-flops $BWUP_1$ through $BWUP_{20}$ will be used as substitute values or update values for the values of the flip-flops $BWSUM_1$ through $BWSUM_{20}$ in the weight arithmetic unit 33 at the time of wrong branch prediction.

In other words, the branch predictor 10 illustrated in FIG. 5 is configured such that the weight arithmetic unit 33 performs a first operation and a second operation based on the weighting factors $W_0$ through $W_{21}$ retrieved from the weight table unit 31 in response to the instruction fetch address FADR. The weight arithmetic unit 33 performs the first operation to produce a first value (e.g., $SUM+W_0$) that serves as a basis for branch prediction for the instruction fetch address FADR, and performs the second operation to produce second values (e.g., the values stored in $BWSUM_{20}$ through $BWSUM_1$) that serve as a basis for future branch prediction.

In addition, the weight update arithmetic unit 34 performs, in parallel with the above-noted second operation, a third operation equivalent to the second operation based on the weighting factors $W_0$ through $W_{21}$ retrieved from the weight table unit in response to an instruction address BADR of a completed branch instruction. This third operation produces third values (e.g., the values stored in $BWUP_{20}$ through $BWUP_1$) that serve as substitute values or update values for the second values (e.g., the values stored in $BWSUM_{20}$ through $BWSUM_1$) when a wrong branch prediction is detected. The values in the flip-flops $BWUP_i$ (i=1 to 20) in the weight update arithmetic unit 34 are then copied to the flip-flops $BWSUM_i$ (i=1 to 20) in the weight arithmetic unit 33, so that the second values stored in the weight arithmetic unit 33 are replaced with the third values when a wrong branch prediction is detected.

Here, the phrase "the third operation is performed in parallel with the second operation" means that the second operation is performed each time the instruction fetch address FADR is supplied, and, concurrently therewith, the third operation is performed each time the instruction address BADR of a completed branch instruction is supplied. The phrase also means that the second values and the third values are accumulated in parallel with each other. The second operation and the third operation may be performed at the same time, or may be performed at different times. The second operation is performed successively according to the flow of an instruction fetch sequence, and, in parallel therewith, the third operation is performed successively according to the flow of a branch instruction completion sequence. Namely, the third operation is not performed all at once in response to detecting a wrong branch prediction as in the related art, but the third operation proceeds at the same time as the second operation proceeds. With this arrangement, data to be used for subsequent branch predictions upon detecting a wrong branch prediction can be prepared in a short time.

In the following, the configuration and operation of the weight update arithmetic unit 34 illustrated in FIG. 9 will be described in detail.

The weight update arithmetic unit 34 receives from the RSBR 18 the completed branch direction BD C indicating whether the branch is taken or not taken for the completed branch instruction. The selector circuit 64 produces the outcome X that assumes +1 if the branch is taken and −1 if the branch is not taken, in response to the completed branch direction BD C.

The weight table unit 31 receives a portion of the address of a fetch line including the completed branch instruction as an index from the RSBR 18, followed by outputting the weighting factors Wi (i=0 to 20) corresponding to the index. Each of the multipliers 60 multiplies the value X by the weighting factor Wi retrieved from the corresponding weight table BWTi (i=1 to 20). Each of the adders 61 adds the result of multiplication of the value X and the weight Wi retrieved from the weight table BWTi (i=1 to 19) to the stored value of the flip-flop $BWUP_{i+1}$, followed by updating the stored value of the flip-flop $BWUP_i$ with the result of addition. As for the weighting factor $W_0$ from the weight table BWT0, the adder 61 adds the weighting factor $W_0$ to the stored value of the flip-flop $BWUP_1$. The result of addition is supplied to the update decision unit 65.

As was previously described, the weight arithmetic unit 33 performs, in response to the instruction fetch address FADR, the second operation based on the weighting factors retrieved from the weight table unit 31 and the predicted branch direction BD_P responsive to the first value. In contrast, the weight update arithmetic unit 34 performs the third operation to produce the third values based on the weighting factors retrieved from the weight table unit 31 in response to the completed instruction address BADR and the branch direction BD C of the completed branch instruction. This arrangement allows weighting operations corresponding to different appropriate branch directions to be performed in the weight arithmetic unit 33 and in the weight update arithmetic unit 34.

As will be described later, 5 flip-flops are provided as the flip-flop $BWUP_1$, and store 5 arithmetic operation results with respective different timings. The selector circuit 63 selects one of the 5 arithmetic operation results based on a sequence count SEQ_CNT supplied from the RSBR 18. The selected arithmetic operation result is to be added to the weighting factor $W_0$.

With the above-described configuration, the weight update arithmetic unit 34 multiplies each of the 20 weighting factors Wi (i=0 to 20) by the outcome value X of the completed branch instruction (X is +1 if the branch is taken, and is −1 if the branch is not taken), thereby obtaining weighted outcomes MUPi (=Wi·X). The weight update arithmetic unit 34 adds the above-noted weighted outcome MUPi to the value stored in the flip-flop $BWUP_{i+1}$, followed by storing the obtained sum in the flip-flop $BWUP_i$. As an exception, $MUP_{20}$ without any change is stored in the flip-flop $BWUP_{20}$.

With this arrangement, $MUP_{20}$ is first stored in the flip-flop $BWUP_{20}$ for a fetch line including a completed branch instruction, and, then, $MUP_{19}$ through $MUP_1$ calculated for the 19 subsequent fetch lines including sequentially completed branch instructions are successively added to $M_{20}$. In the end, the value SUMUP stored in the flip-flop $BWUP_1$ has a value shown below.

$$SUMUP=MUP_{20}+MUP_{19}+\ldots MUP_2+MUP_1$$

These calculations are performed when information about a branch instruction supplied from the RSBR 18 indicates that the completed branch instruction belongs to a new fetch line, i.e., that the branch instruction completed this time belongs to a different fetch line than the branch instruction completed the last time. Namely, the above-noted calculations are performed on a fetch-line-by-fetch-line basis.

Whether or not a completed branch instruction belongs to a new fetch line is determined based on the sequence count SEQ_CNT. The sequence count SEQ_CNT is information associated with each branch instruction when the branch instruction is registered from the instruction decoder 14 to the RSBR 18, and indicates how many fetch lines have passed before the branch instruction is registered in the RSBR 18 for the first time since the last registration. The fact that the sequence count SEQ_CNT associated with a given branch instruction is zero means that this branch instruction belongs to the same fetch line as the immediately preceding branch instruction.

In order to create the sequence count SEQ_CNT, a counter may be provided in the instruction decoder 14. The instruction decoder 14 counts up the counter each time an instruction at a boundary between fetch lines is issued. Each time a branch instruction is issued, the instruction decoder 14 transmits the current count value to the RSBR 18 with the branch instruction, followed by resetting the count to zero. When a wrong branch prediction occurs, the value of the sequence count SEQ_CNT existing at the time of detecting such an occurrence is an erroneous value based on the wrong branch prediction. The counter is thus reset. Counting in the counter resumes when a correct instruction is fetched by an instruction re-fetch.

The weight update arithmetic unit 34 includes the update decision unit 65 for determining whether or not to perform a weighting factor update in the weight table update unit 35. The update determination process in the update decision unit 65 uses $SUMUP+W_0$ (i.e., the output value of the adder 61), which is a value equivalent to $SUM+W_0$ calculated for branch direction determination at the time of prediction. Specifically, an update is performed when the value of $SUMUP+W_0$ is less than a predetermined threshold or when the predicted branch direction that would be calculated by using the value of $SUMUP+W_0$ is different from the actual branch direction (i.e., in the case of a wrong branch prediction).

The reason for performing an update when the value is less than the predetermined threshold is that learning based on the past history may be considered to have not yet sufficiently progressed in the current state. The state in which the value is greater than or equal to the predetermined threshold means that learning has sufficiently progressed. In this case, no update is performed in order to avoid a situation in which over-learning causes difficulty to adapt to subsequent changes.

As described above, the weight update arithmetic unit 34 generates a fourth value (e.g., the output value of the update decision unit 65) indicating whether the weighting factors corresponding to the completed instruction address BADR need to be updated, based on a value (e.g., $SUMUP+W_0$) obtained from the third value (e.g., the stored value in $BWUP_1$). The weight table update unit 35 updates the weighting factors in the weight table unit 31 when the above-noted fourth value indicates the need to update the weighting factors. Compared to the case in which the weighting factors are updated in accordance with the first value (e.g., $SUM+W_0$) corresponding to an instruction subject to prediction as in the related art, the above-noted arrangement enables an weighting-factor update with higher accuracy because the weighting factors are updated in accordance with the value obtained from the third value corresponding to a completed branch instruction.

As was previously described, when the weight arithmetic unit 33 calculates $SUM+W_0$ at the time of prediction, the fetch line for computing the value SUM stored in the flip-flop $BWSUM_1$ is 4th fetch line preceding the fetch line for which the weighting factor $W_0$ is obtained. Accordingly, a 4-fetch-line difference may also need to be introduced when the weight update arithmetic unit 34 calculates $SUMUP+W_0$. For this purpose, 5 flip-flops are provided as the flip-flop $BWUP_1$, and the selector circuit 63 selects one of the five stored values in the 5 flip-flops based on the sequence count SEQ_CNT.

A completed branch instruction newly supplied from the RSBR 18 is denoted as a branch instruction A. Among the first flip-flop to the fifth flip-flop provided as the flip-flops $BWUP_1$, the first flip-flop stores the value of SUMUP calculated for a branch instruction B that was completed immediately before the branch instruction A. The second flip-flop stores the value of SUMUP calculated for the fetch line immediately preceding the branch instruction B. The third flip-flop stores the value of SUMUP calculated for the 2nd fetch line preceding the branch instruction B. The fourth flip-flop stores the value of SUMUP calculated for the 3rd fetch line preceding the branch instruction B. The fifth flip-flop stores the value of SUMUP calculated for the 4th fetch line preceding the branch instruction B.

When the value of the sequence count SEQ_CNT associated with the branch instruction A is zero, the branch instruction A belongs to the same fetch line as the branch instruction B. In this case, the weighting factor $W_0$ is added to SUMUP stored in the fifth flip-flop that is for the 4th fetch line preceding the branch instruction B. Similarly, when the value of the sequence count SEQ_CNT is 1, the weighting factor $W_0$ is added to SUMUP stored in the fourth flip-flop that is for the 3rd fetch line preceding the branch instruction B. The same applies to the remaining circumstances. When the value of the sequence count SEQ_CNT is 4 or more, the weighting factor $W_0$ is added to SUMUP stored in the first flip-flop that is for the fetch line including the branch instruction B.

An update of the weighting factors may be performed separately for each of the plurality of branch instructions included in one fetch line. Update processes performed in this case may update the weighting factors W00 through W04 illustrated in FIG. 8 corresponding to the respective branch instructions.

As is described above, the weight update arithmetic unit 34 stores the third values (e.g., SUMUP) corresponding to respective, successively completed instruction addresses in the respective buffers (i.e., the 5 flip-flops $BWUP_1$). One of the plurality of buffers is selected according to a gap between the completed consecutive instruction addresses, and the fourth value (e.g., the output value of the update decision unit 65) is generated based on the third value stored in the selected buffer. With this arrangement, a relatively simple configuration may be used to absorb variation in the distance between fetch lines when determining whether or not to perform a weighting factor update.

Figure 10:
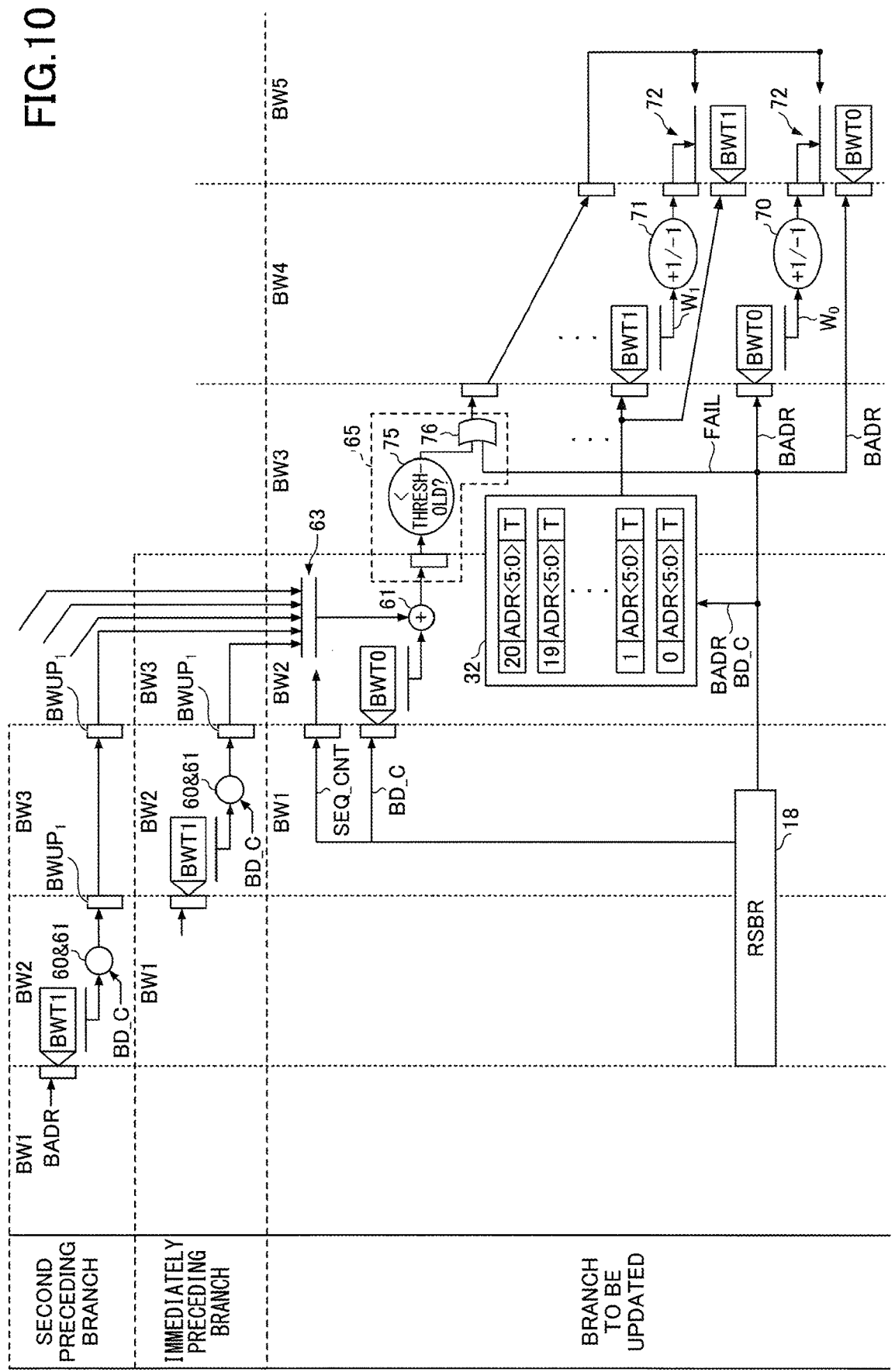
FIG. 10 is a drawing schematically illustrating the progress of update computation by a weight table update unit.

FIG. 10 is a drawing schematically illustrating the progress of update computation by the weight table update unit 35. In FIG. 10, BW1, BW2, and so on are stages of an update operation pipeline. The multipliers 60, the adders 61, the flip-flops $BWUP_1$, the selector circuit 63, and the update decision unit 65 illustrated in FIG. 10 are the same as the multipliers 60, the adders 61, the flip-flops $BWUP_1$, the selector circuit 63, and the update decision unit 65 illustrated in FIG. 9. It may be noted that the update decision unit 65 in the example illustrated in FIG. 10 determines whether a branch prediction is wrong based on a prediction failure signal FAIL (which assumes 1 in the case of wrong prediction and 0 in the case of correct prediction), which is supplied from the RSBR 18 to indicate the failure of branch prediction. In FIG. 10, the multiplier 60 and the adder 61 are consolidated into one unit in the illustration.

An arithmetic unit 75 of the update decision unit 65 compares the value of SUMUP+$W_0$ with a predetermined threshold, followed by setting an output thereof to 1 when the value of SUMUP+$W_0$ is less than the predetermined threshold, and otherwise setting the output to 0. The output of an OR gate 76 is 1 when the value of SUMUP+$W_0$ is less than the predetermined threshold or when a branch prediction failure is detected (i.e., FAIL=1). Otherwise the output of the OR gate 76 is 0. The update decision unit 65 outputs the output of the OR gate 76 as a 315 decision value.

The completed branch instruction path history 32, which is also illustrated in FIG. 5, is constructed based on information about completed branch instructions provided from the RSBR 18. In the completed branch instruction path history 32, a portion of the address of a given fetch line (i.e., 6 bits in this example) and the branch direction of an executed branch instruction included in this fetch line are associated with each other and registered as an entry. In the example illustrated in FIG. 5, the number of entries is 21. Data indicative of branch directions for these 21 fetch lines is referred to as a global history. The branch directions of the global history is given on a fetch-line-specific basis. The branch direction for a given fetch-line indicates "branch taken" if at least one branch instruction for which the branch is taken is included in the fetch-line. Otherwise the branch direction indicates "branch not taken".

In the completed branch instruction path history 32, a 0th entry corresponds to both the branch instruction subject to update in the weight table update unit 35 and the weight table BWT0. A 1st entry corresponds to both the branch instruction in the 4th fetch line preceding the fetch line including the branch instruction subject to update and the weight table BWT1. A 2nd entry corresponds to both the branch instruction in the 5th fetch line preceding the fetch line including the branch instruction subject to update and the weight table BWT2. The same applies to the rest of the entries. A 20th entry corresponds to both the branch instruction in the 23rd fetch line preceding the fetch line including the branch instruction subject to update and the weight table BWT20.

The address of the above-noted branch instruction A supplied from the RSBR 18 is supplied to the weight table BWT0 to retrieve the corresponding weighting factor $W_0$. The addresses of the fetch lines stored in the completed branch instruction path history 32 are supplied to the respective weight tables BWTi (i=1 to 20) to retrieve the respective weighting factors Wi (i=1 to 20). In FIG. 10, only the weight tables BWT0 and BWT1 are illustrated for the sake of clarity of illustration, but the remaining weight tables are treated similarly.

In the arithmetic unit 70, the branch direction of the branch instruction A indicative of "branch taken" causes +1 to be added to the weighting factor $W_0$, and the branch direction of the branch instruction A indicative of "branch not taken" causes −1 to be added to the weighting factor $W_0$. The obtained result is supplied to a write control unit 72. The branch direction of the branch instruction A is supplied from the 0th entry of the completed branch instruction path history 32.

The arithmetic unit 71 adds +1 to the weighting factor Wi if the branch direction of the branch instruction A is the same direction as the branch direction stored in the i-th entry of the completed branch instruction path history 32. The arithmetic unit 71 adds −1 to the weighting factor Wi if the branch direction of the branch instruction A is the opposite direction to the branch direction stored in the i-th entry of the completed branch instruction path history 32. The result is supplied to a corresponding write control unit 72.

The write control unit 72 writes back to the corresponding weight table the calculated value supplied from the arithmetic unit 70 or 71 when the decision value supplied form the update decision unit 65 is 1. In this manner, the weighting factors in the weight tables BWTi (i=1 to 20) are updated.

Figure 11:
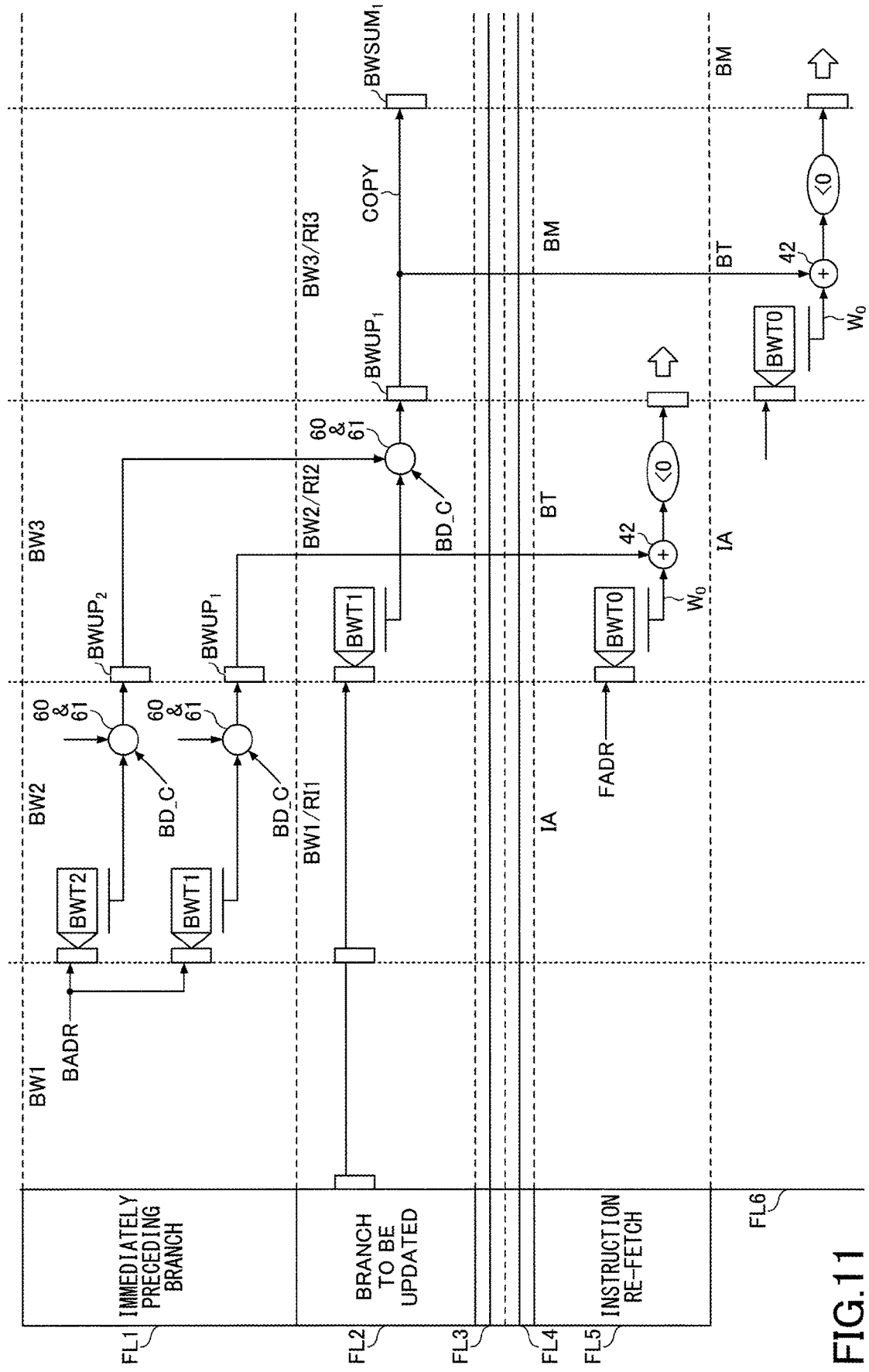
FIG. 11 is a drawing schematically illustrating a data update process performed by the weight arithmetic unit at the time of a wrong branch prediction.

FIG. 11 is a drawing schematically illustrating a data update process performed by the weight arithmetic unit 33 at the time of a wrong branch prediction.

At the time of branch prediction, the value SUM stored in the flip-flop $BWSUM_1$ is added to the weighting factor $W_0$, which is retrieved from the weight table BWT0 by using a portion of the instruction fetch address as an index. When branch prediction is made at the first fetch line after resuming an instruction fetch upon a pipeline cancellation caused by a wrong branch prediction, the value SUM of the flip-flop BWSUM$_1$ may be restored to a value that is appropriate for the re-fetched instruction address. This cannot be realized unless the restored state for the fetch line of the re-fetched instruction upon the detection of a wrong branch prediction is identical to the state that would have existed for the same fetch line if a wrong branch prediction had not occurred. In order to achieve this, as was previously described above, the weight update arithmetic unit 34 calculates the stored values in the flip-flops BWUP$_i$ (i=1 to 20) that would be the same as the calculated values in the flip-flops BWSUM$_i$ (i=1 to 20) of the weight arithmetic unit 33.

FIG. 11 illustrates a case in which the branch prediction was "branch not taken" for a second fetch line FL2 from the top in the figure, but the result of executing the branch arithmetic indicates "branch taken", which is detected as a wrong branch prediction. If the branch prediction had correctly been "branch taken", third and fourth fetch lines FL3 and FL4 in the regular instruction sequence would have been canceled, and a fifth fetch line FL5 would have served as a correct branch destination for continuing an instruction fetch, as was described in connection with FIG. 4.

At the time of prediction for the branch-destination fetch line FL5, the fetch line corresponding to the weight table BWT1 should be the 4th fetch line preceding the fetch line FL5, which is the first fetch line FL1 in FIG. 11. Accordingly, the stored value in the flip-flop BWSUM$_1$ of the weight arithmetic unit 33 should be restored to a value SUM for which calculations up to the first fetch line FL1 have been made.

A wrong branch prediction is detected in the U stage of the branch instruction. The RI' stage (i.e., the first stage of an instruction restoration upon the detection of a wrong branch prediction) is at the same timing as the IA stage of the fetch line FL5 that is the first fetch line after the instruction re-fetch. At this point, the update values of the flip-flops BWUP$_i$ (i=1 to 20) in the weight update arithmetic unit 34 corresponding to a branch instruction in the first fetch line FL1 are still being calculated, so that the stored value SUMUP in the flip-flop BWUP$_1$ has not yet been determined. Due to the limitation of space in the drawing, only the flip-flops BWUP$_1$ and BWUP$_2$ among the flip-flops BWUP$_i$ (i=1 to 20) are illustrated in FIG. 11.

The next RI2 stage is at the same timing as the BT stage of the fetch line FL5 that is the first fetch line of the instruction re-fetch. At this point, the stored value SUMUP in the flip-flop BWUP$_1$ of the weight update arithmetic unit 34 is already fixed. This stored value SUMUP is transferred directly to the weight arithmetic unit and used in place of the value SUM, thereby allowing the weighting operation to be performed. Namely, in the BT stage of the fetch line FL5, the arithmetic unit 42 adds the stored value of BWUP$_1$ for the fetch line FL1 to the weighting factor W$_0$ retrieved from the weight table BWT0. This arrangement enables branch prediction for the first fetch line FL5 of the instruction re-fetch.

The next RI3 stage is at the same timing as the BT stage of a fetch line FL6 that is the second fetch line after the instruction re-fetch. At the time of prediction for the fetch line FL6, the second fetch line FL2, for which a wrong branch prediction is detected, corresponds to the weight table BWT1. At this point, the stored value SUMUP in the flip-flop BWUP$_1$ of the weight update arithmetic unit 34 is already fixed for the branch instruction for which a wrong branch prediction is detected. This stored value SUMUP is transferred directly to the weight arithmetic unit 33 and used in place of the value SUM, thereby allowing the weighting operation to be performed. Namely, in the BT stage of the fetch line FL6, the arithmetic unit 42 adds the stored value of BWUP$_1$ for the fetch line FL2 to the weighting factor W$_0$ retrieved from the weight table BWT0. This arrangement enables branch prediction for the second fetch line FL6 after the instruction re-fetch.

In the RI3 stage, the update values in the flip-flops BWUP$_i$ (i=1 to 20) in the weight update arithmetic unit 34 are already fixed for the fetch line FL2 for which a wrong branch prediction is detected. Accordingly, copying the values of the flip-flops BWUP$_i$ (i=1 to 20) in the weight update arithmetic unit 34 to the respective flip-flops BWSUM$_i$ (i=1 to 20) in the weight arithmetic unit in this RI3 stage allows restoration of the calculated values of the flip-flops in the weight arithmetic unit 33 to be is completed.

According to at least one embodiment, data to be used for branch prediction with respect to a subsequent instruction are prepared in a short time upon the detection of wrong branch prediction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An arithmetic processing apparatus, comprising:
   weight tables each configured to store weighting factors in one-to-one correspondence with indexes that are associated with instruction addresses, the weight tables causing some of the weighting factors to be retrieved therefrom in response to an instruction fetch address supplied thereto, and causing some of the weighting factors to be retrieved therefrom in response to a completed-instruction address of a completed branch instruction;
   a first weight arithmetic circuit configured to perform a first operation and a second operation based on the weighting factors retrieved from the weight tables in response to the instruction fetch address, the first operation producing at least one first value that serves as a basis for branch prediction for the instruction fetch address, the second operation producing second values that serve as a basis for future branch prediction, and storing the second values in the first weight arithmetic circuit; and
   a second weight arithmetic circuit configured to perform, in parallel with the second operation, a third operation equivalent to the second operation based on the weighting factors retrieved from the weight tables in response to the completed-instruction address of the completed branch instruction, the third operation producing third values that are to serve as substitute values or update values for the second values when a wrong branch prediction is detected,
   wherein the second values stored in the first weight arithmetic circuit are replaced with the third values upon detection of the wrong branch prediction.

2. The arithmetic processing apparatus as claimed in claim 1, wherein
   the first weight arithmetic circuit is configured to perform the second operation based on a predicted branch direction responsive to the at least one first value and the weighting factors retrieved from the weight tables in response to the instruction fetch address to produce the second values, and the second weight arithmetic circuit is configured to perform the third operation based on a branch direction of the completed branch instruction and the weighting factors retrieved from the weight tables in response to the completed-instruction address to produce the third values.

3. The arithmetic processing apparatus as claimed in claim 1, further comprising a weight table update circuit configured to update the weighting factors in the weight tables, wherein the second weight arithmetic circuit is configured to produce a fourth value indicating whether to update weighting factors corresponding to a completed-instruction address, among the weighting factors stored in the weight tables, and the weight table update circuit is configured to update the weighting factors corresponding to the completed-instruction address in the weight tables in response to the fourth value indicating an update of weighting factors.

4. The arithmetic processing apparatus as claimed in claim 3, wherein the third values are stored in buffers of the second weight arithmetic circuit, and correspond to respective completed-instruction addresses that are consecutive, the second weight arithmetic circuit is configured to select one buffer among the buffers in response to a distance between the completed-instruction addresses, and to produce the fourth value based on a third value stored in the selected buffer.

5. The arithmetic processing apparatus as claimed in claim 3, wherein the weight tables have a first port to receive an instruction fetch address and a second port to receive a completed-instruction address.

6. The arithmetic processing apparatus as claimed in claim 5, wherein the weight tables have third ports to receive completed-instruction addresses that are to be used for updating weighting factors corresponding to the completed-instruction addresses.

7. A method of controlling an arithmetic processing apparatus which includes weight tables each configured to store weighting factors in one-to-one correspondence with indexes that are associated with instruction addresses, the weight tables causing some of the weighting factors to be retrieved therefrom in response to an instruction fetch address supplied thereto, and causing some of the weighting factors to be retrieved therefrom in response to a completed-instruction address of a completed branch instruction, the method comprising:

performing a first operation and a second operation based on the weighting factors retrieved from the weight tables in response to the instruction fetch address, the first operation producing at least one first value that serves as a basis for branch prediction for the instruction fetch address, the second operation producing second values that serve as a basis for future branch prediction;

performing, in parallel with the second operation, a third operation equivalent to the second operation based on the weighting factors retrieved from the weight tables in response to the completed-instruction address of the completed branch instruction, the third operation producing third values that are to serve as substitute values or update values for the second values when a wrong branch prediction is detected; and replacing the second values with the third values upon detecting the wrong branch prediction.

* * * * *